(12) United States Patent
VanBlon et al.

(10) Patent No.: US 11,197,056 B2
(45) Date of Patent: Dec. 7, 2021

(54) TECHNIQUES FOR CONTENT CAST MODE

(71) Applicant: Lenovo (Singapore) Pte. Ltd., Singapore (SG)

(72) Inventors: Russell Speight VanBlon, Raleigh, NC (US); Mark Patrick Delaney, Raleigh, NC (US); Nathan J. Peterson, Oxford, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 99 days.

(21) Appl. No.: 16/536,036

(22) Filed: Aug. 8, 2019

(65) Prior Publication Data
US 2021/0044858 A1   Feb. 11, 2021

(51) Int. Cl.
| | |
|---|---|
| *H04N 21/431* | (2011.01) |
| *H04N 21/45* | (2011.01) |
| *H04N 21/442* | (2011.01) |
| *H04N 21/43* | (2011.01) |

(52) U.S. Cl.
CPC ..... *H04N 21/4316* (2013.01); *H04N 21/4307* (2013.01); *H04N 21/44204* (2013.01); *H04N 21/4532* (2013.01)

(58) Field of Classification Search
CPC .......... H04N 21/4316; H04N 21/4307; H04N 21/44204; H04N 21/4532; H04N 21/44218; H04N 21/4122; H04N 5/45; H04N 21/4438
See application file for complete search history.

(56) References Cited

U.S. PATENT DOCUMENTS

| | | | | |
|---|---|---|---|---|
| 2013/0050274 | A1* | 2/2013 | Yamada | H04N 21/4316 345/671 |
| 2015/0309687 | A1* | 10/2015 | Herigstad | H04N 21/42224 715/784 |
| 2015/0334334 | A1* | 11/2015 | White | H04N 5/4403 348/734 |
| 2017/0208364 | A1* | 7/2017 | Glazier | H04N 21/4432 |
| 2018/0004684 | A1* | 1/2018 | Ihara | H04N 13/20 |
| 2019/0320219 | A1* | 10/2019 | Yoden | G06F 3/0486 |

* cited by examiner

*Primary Examiner* — John R Schnurr
(74) *Attorney, Agent, or Firm* — John M. Rogitz; John L. Rogitz

(57) ABSTRACT

In one aspect, a first device includes at least one processor and storage accessible to the at least one processor. The storage may include instructions executable by the at least one processor to receive a cast command in response to input to a source device, and to establish a cast mode to cast content from the source device to a target device pursuant to the cast command. The cast mode may be established based at least in part on information appertaining to the target device. The instructions may also be executable to present the content on the target device in a first format responsive to establishing a first cast mode and to present the content on the target device in a second format responsive to establishing a second cast mode.

20 Claims, 8 Drawing Sheets

TECHNIQUES FOR CONTENT CAST MODE

FIELD

The present application relates to technically inventive, non-routine solutions that are necessarily rooted in computer technology and that produce concrete technical improvements.

BACKGROUND

As recognized herein, when casting content from one computerized device to another computerized device that is already in use, there is currently no way for content from multiple content sources to smoothly coexist on the target screen. Thus, casting is typically a single full screen experience. Multi-window scenarios have not carried into techniques used for casting applications and content. For this reason, a user can cast content from a source device to a target device, but this stops any existing content on the target device from being displayed.

There are currently no adequate solutions to the foregoing computer-related, technological problem.

SUMMARY

Accordingly, in one aspect a first device includes at least one processor and storage accessible to the at least one processor. The storage includes instructions executable by the at least one processor to receive a cast command in response to input to a source device. The instructions are executable to establish a cast mode to cast content from the source device to a target device pursuant to the cast command. The cast mode is established based at least in part on information appertaining to the target device. The instructions are executable to, responsive to establishing a first cast mode, present the content on the target device in a first format, and responsive to establishing a second cast mode, present the content on the target device in a second format.

In examples, the information appertaining to the target device is the target device being used to present content from a source other than the source device, and the first cast mode is established responsive thereto, with the first format being less than full screen format. Or, the information appertaining to the target device can be the target device not being used to present content from a source other than the source device, and the second cast mode is established responsive thereto, with the second format being full screen format.

The cast mode may be established by the source device and/or by the target device. The cast mode may be established after receipt of the cast command, or the cast mode can be established prior to receipt of the cast command.

In another aspect, a computer readable storage medium (CRSM) that is not a transitory signal includes instructions executable by at least one processor to receive a cast command generated by input to a source device. The instructions are executable to determine whether a target device is in use, and responsive to determining that the target device is not in use, present content cast from the source device on the target device in a first format. The instructions are executable to, responsive to determining that the target device is in use and presenting first content, present content cast from the source device on the target device in a second format. The instructions are further executable to, responsive to determining that the target device is in use and presenting second content, present content cast from the source device on the target device in a third format.

In another aspect, a method includes identifying a cast command and responsive to the cast command, sending content from a source device or receiving content from the source device by a target device. The method includes causing the content to be presented on the target device based on information appertaining to use of the target device.

The details of present principles, both as to their structure and operation, can best be understood in reference to the accompanying drawings, in which like reference numerals refer to like parts, and in which:

DETAILED DESCRIPTION

Figure 1:
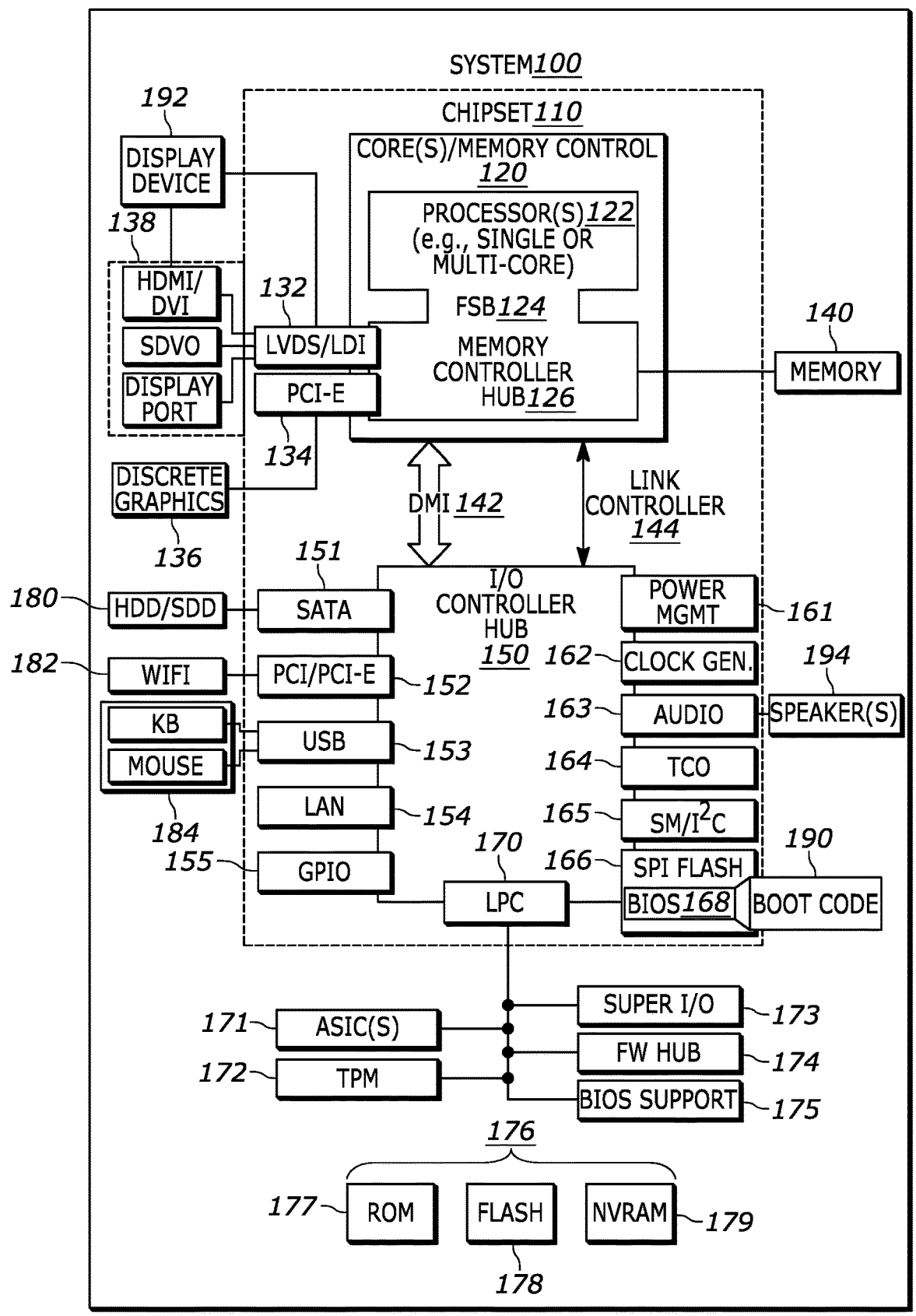
FIG. 1 is a block diagram of an example system consistent with present principles.

A 'mode' is established to cast content from a source device to a target device depending on the current activity of the target device. For example, when the user casts something from a smartphone (e.g., live social media posts) to a TV, the 'mode' depends on what the TV is already displaying. If the TV isn't being used, the cast content fills the TV screen. If the TV is playing a video/show from another content source (e.g., another remote device, or fixed playback device such as Roku®, FireTV®, etc.) the mode is changed to present the cast content in a semi-transparent window on a corner of the TV screen or a non-transparent picture-in-picture window on the corner. Or, the mode may be changed to a split screen mode depending how the cast content is configured by the application creator or based on user preference.

The 'mode' may be established at the time of casting, e.g., cast as full screen, cast as mini-window, cast as semi-transparent overlapping, cast to corner, etc.

It may be determined whether anyone else beside the casting user is watching the target device or if the TV is presenting content with no audience, and the cast mode may be established accordingly, e.g., full screen presentation of the cast content when no one else is watching the target device, other than full screen presentation of the cast content when someone else is watching the target device.

In example embodiments, particular persons may be recognized by the target device and in response a personalized user interface (UI) may be presented on a portion of the target device showing notifications appertaining to recognized persons. Some programs may be configured to use full screen when cast to the target device and other content when cast may be cast in a multitask/overlap mode. Thus, for instance, if a person is watching a daily news program on the target device, then cast content will be presented on the target device in a multi-tasking mode, in which the news program occupies part of the target device screen and the cast content occupies part of the target device screen. On the other hand, if the target device is presenting a movie for example, cast content is not permitted to be presented on the target device screen, and the movie remains in full screen presentation mode. Yet again, a message may be unobtrusively presented on the target device responsive to an attempt to cast content to it giving the user the option to grant access to others that wish to display mixed mode content.

A parental control component may be provided in which one person decides what target device content can be mixed with content sought to be cast from a source device, and by whom. The cast mode may also depend on whether a sole viewer is detected of the target device or whether a group of people are detected watching the target device. Some example use cases where mixed cast mode may be desired by the user include: group chat stream, social media posts, stock tickers, sporting event score, sharing video during commercials, text message application, etc.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
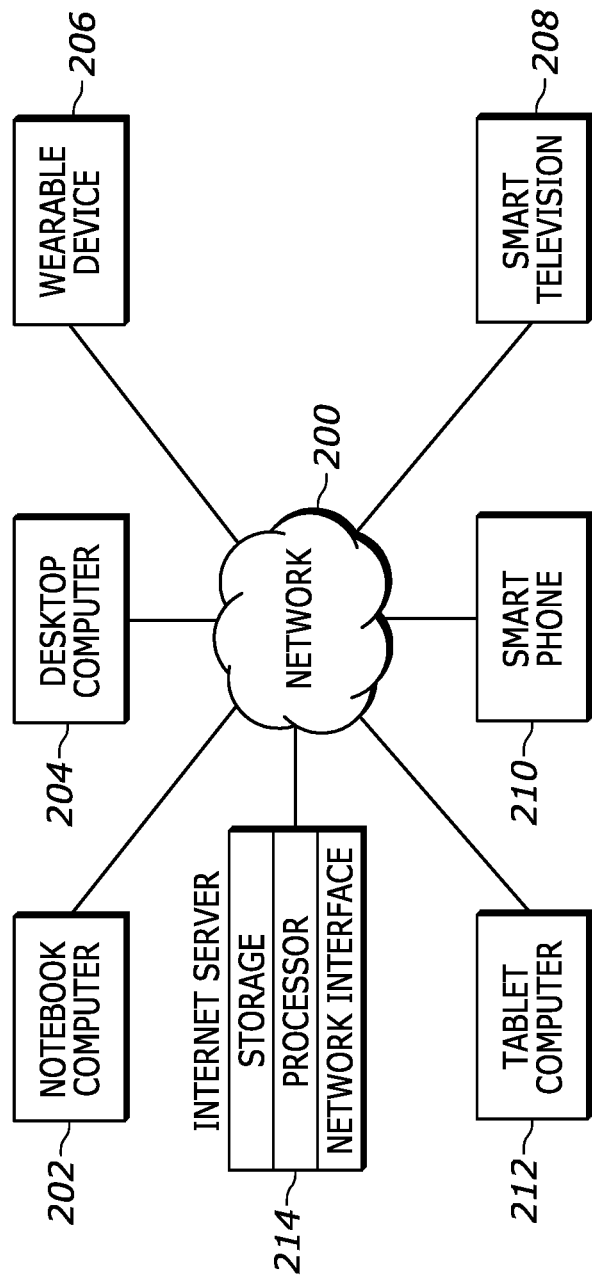
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
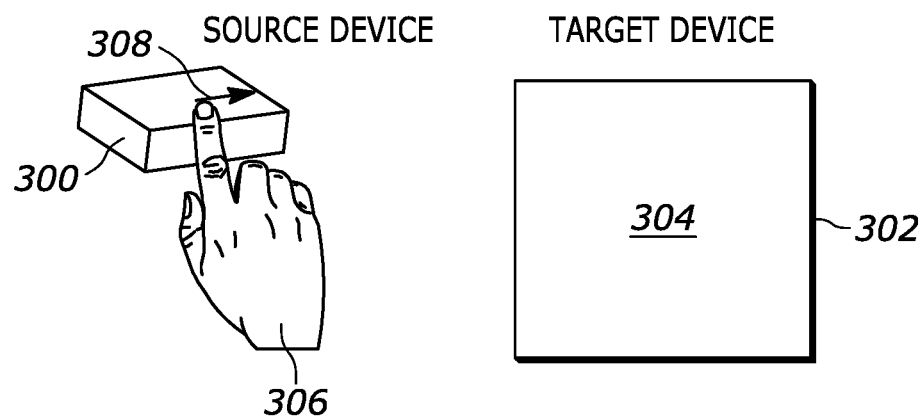
FIG. 3 is a block diagram of a source and target cast system consistent with present principles.

Referring to FIG. 3, a source device 300 such as but not limited to a wireless telephone may be used to "cast" content to a target device 2302 with video display 304 for presenting the content cast from the source device 300. To "cast" the content from the source device, be the content an application ("app") or other content such as a social media feed or web page, etc., a person 306 may make a gesture on, for example, a touchscreen of the source device as indicated by the arrow 308 in the general direction of the target device 302. This causes the source device 300 to automatically and typically without further user input wirelessly transmit the content that is currently being executed on screen of the source device to the target device 302.

Figure 4:
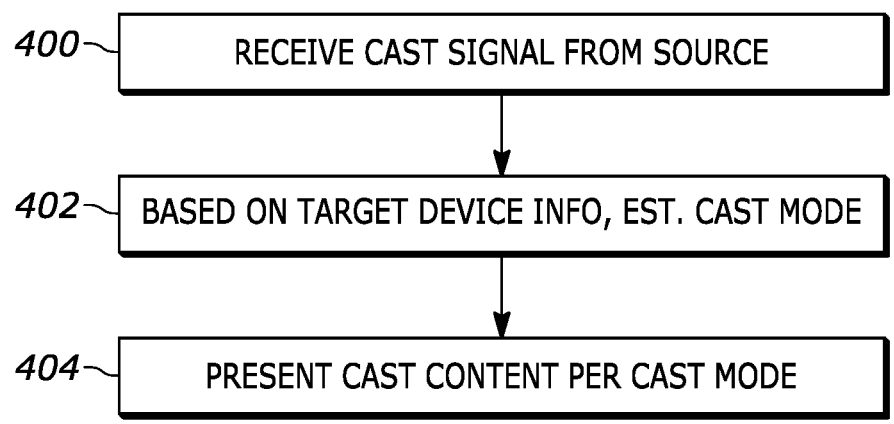
FIG. 4 is a flow chart of example logic consistent with present principles.

FIG. 4 illustrates example overall logic attendant to FIG. 3. Note that while FIG. 4 and other flow charts may illustrate logic in flow chart format, state logic or other equivalent logic may be used.

Commencing at block 400, a cast signal or command is received from the source device 300, e.g., by the person 306 executing an appropriate gesture or other input command such as a voice command to "throw" or "cast" verbalized content, input via a mouse, keypad, or other input device, an eye movement of the person that is tracked by a camera and eye tracking software in the source device 300 and/or target device 302, etc.

Proceeding to block 402, a 'mode' is established to cast content from the source device 300 to the target device 302 depending on information appertaining to the target device 302, such as based on the current activity of the target device 302. For example, when the user casts content from the source device 300 (e.g., live social media posts) to a target device 302 that may be implemented by an audio video display device (AVDD) such as a TV, the 'mode' is established based on what the TV is already displaying. If the TV isn't being used, the mode may be a first mode in which cast content is presented at block 404 to fill the TV screen. If the TV is playing a video/show from another content source (e.g., another remote device, or fixed playback device such as Roku®, FireTV®, etc.) the mode may be established to be a second mode different from the first mode in which, for example, cast content is presented at block 404 in a semi-transparent window on a corner of the TV screen. Or, the mode may be established such that the target device 302 assumes a split screen mode, which in turn may further depend on how the cast content is configured by the application creator or based on user preference.

The 'mode' may be established at the time of casting, e.g., cast as full screen, cast as mini-window, cast as semi-transparent overlapping, cast to corner, etc. The logic of FIG. 4, blocks 400 and 402 may be implemented by the source device prior to input of a cast command or subsequent to input of a cast command, in which case the source and target devices signal each other as to the status of the target device and/or status of the source device. The source device may then re-format the content to be cast according to the cast mode and then transmit the reformatted content to the target device.

Or, the logic of FIG. 4, blocks 400-404 may be implemented by the target device before or after receipt of a cast command from the source device and cast mode may be established prior to or after receiving a cast command. Source-target signaling may be implemented in such an embodiment. The target device may reformat content cast from the source device according to the cast mode and then present the content.

The logic may be implemented by the source device 300 and target device 302 in cooperation with each other.

Figure 5:
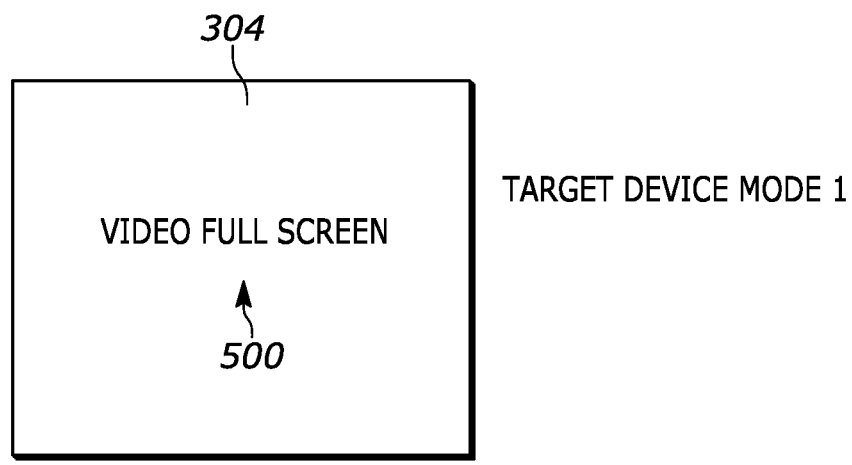
FIGS. 5-7 are screen shots of example cast modes on the target device consistent with present principles.
Figure 6:
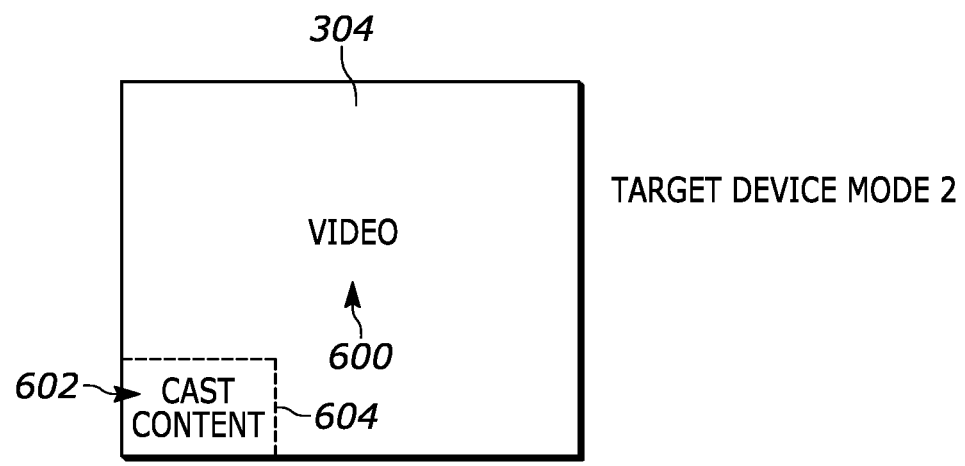
Figure 7:
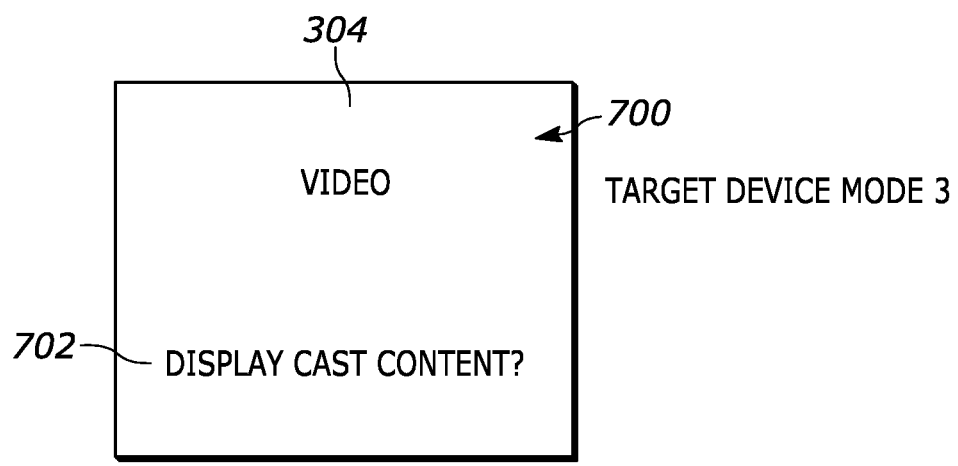

FIGS. 5-7 illustrate respective presentation formats on the target device display 304 of content cast from the source device 300 which correspond to respective cast modes. In FIG. 5 video 500 from a source other than the source device 300 is presented by the target device 302, meaning in this cast mode, no content cast from the source device is presented by the target device even though the cast command and indeed content itself may have been received by the target device. This may be the preferred mode when, for example, a full length movie is being presented on the target device and the viewers (or the mode protocol default in such a case) do not wish to be distracted by content cast from the source device.

FIG. 6 illustrates a presentation format in which video 600 from a source other than the source device 300 is presented by the target device 302, and content 602 cast to the target device 302 by the source device 300 is presented in a small window 604 (in the example shown, the bottom left corner) of the display 304. The window 604 may be opaque or transparent, i.e., the video 600 may be seen under the cast content 602 or the cast content 602 may completely block view of the video 600 in the window 604 in which the cast content is presented.

FIG. 7 illustrates yet a third display mode, in which video 700 from a source other than the source device 300 is presented by the target device 302, and responsive to receiving a cast command, a prompt 702 is presented to allow the viewer to select whether to present the cast content or not, e.g., using specified keys on a remote control associated with the target device, or voice command, or other technique.

Figure 8:
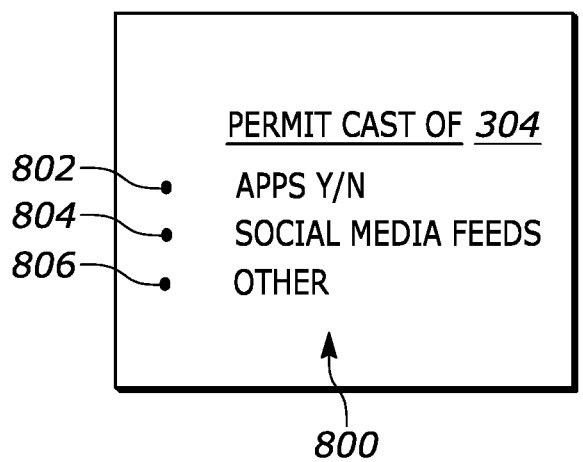
FIG. 8 a screen shot of an example user interface (UI) enabling a user to establish cast modes consistent with present principles.

FIG. 8 illustrates a user interface (UI) 800 with selectors that may be selected using, e.g., a remote control to establish what type of content that may sought to be cast from a source device is permitted to be presented on the target device 302. For example, respective selectors 802, 804, 806 may be presented to permit or prohibit applications, social media feeds, or other content types to be presented on the target device 302 responsive to an attempt to cast the content from the source device 300.

Figure 9:
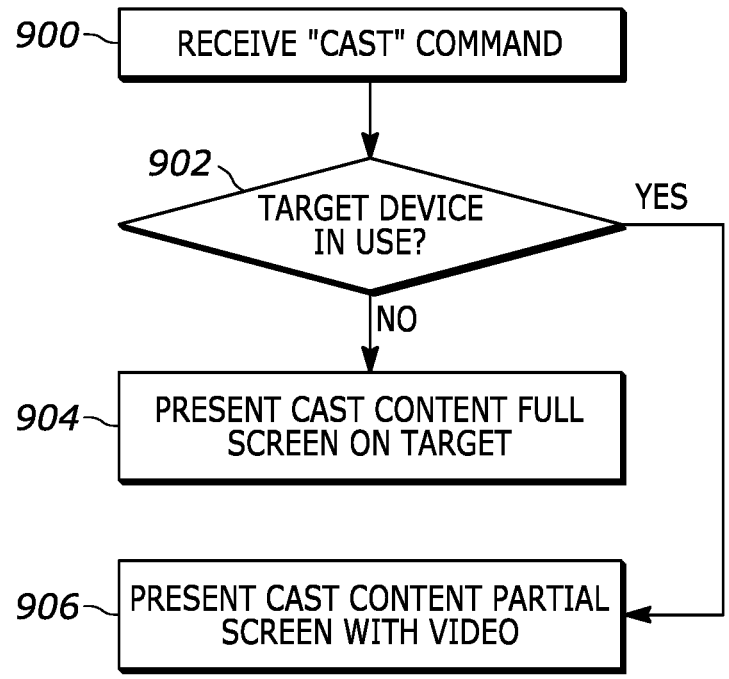
FIGS. 9-11 are flow charts of example logic for establishing cast mode in various embodiments.

FIG. 9 illustrates at block 900 receiving a cast command responsive to input at the source device 300, and then determining at state 902 whether the target device is presenting content from a source other than the source device 300. If it is not, the target device may be energized or awakened from a sleep mode as appropriate at block 904 and the cast content presented full screen on the target device 302. In contrast, if the target device is already in use the logic may move to block 906 to present the cast content from the source device 300 in a partial screen (window) of the target device 302 along with the video being presented by the target device.

Figure 10:
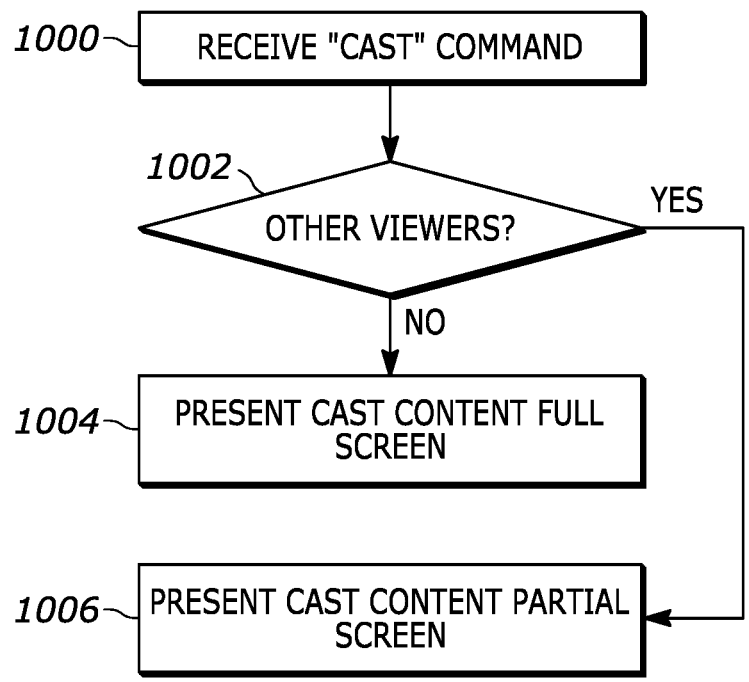

FIG. 10 illustrates logic in which a cast command is received at block 100, and then at state 1002 it is determined whether anyone else beside the casting user is watching the target device 302, or if the target device 302 is presenting content with no audience, and the cast mode may be established accordingly, e.g., full screen presentation of the cast content at block 1004 when no one else is watching the target device, other than full screen presentation of the cast content at block 1006 when someone else is watching the target device. The determination may be made at state 1002 by either the source device 300, target device 302, or both using, for example, images from cameras no the respective devices that are input to face recognition software. Voice recognition may also or alternatively be used.

Figure 11:
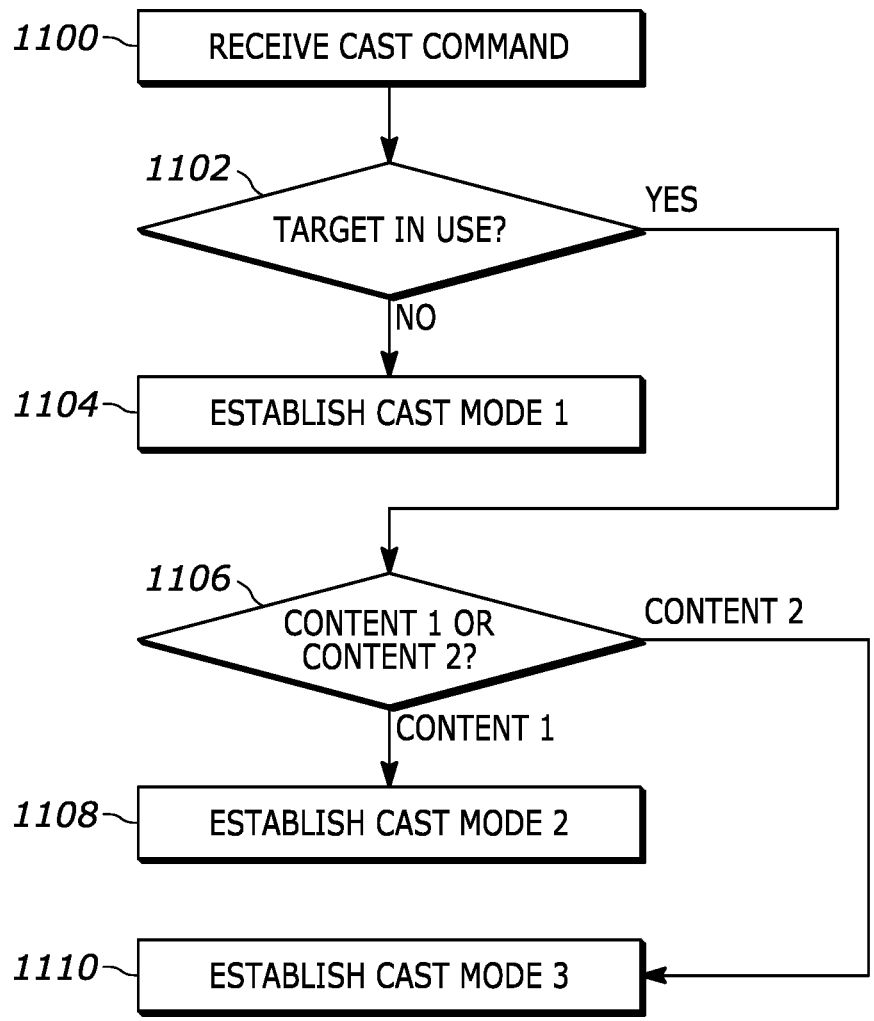

FIG. 11 illustrates that content cast from the source device 300 may be presented in different presentation modes depending not only no whether the target device is already in use but also on the type of content sought to be cast from the source device 300, or the type of content being presented by the target device 302 prior to the cast command, or both. Content type may be ascertained by, e.g., metadata accompanying the content, image recognition implemented on the content, information from an electronic program guide (EPG) available to either or both devices 300, 302, etc.

A cast command is received at block 100 and it is determined in response at state 1102 whether the target device is in use, i.e., is presenting content prior to receipt of the cast command. If not, a first cast mode (establishing a first cast content presentation format) is returned at block 1104 and cast content from the source device 300 presented on the target device 302 in accordance therewith.

If, on the other hand, the target device 302 is in use, the logic may flow to state 1106 to detect a type of content or indeed a specific piece of content being presented on the target device prior to the cast command. For simplicity, FIG. 11 assumes there are only two types or pieces of content the target device might present, it being understood that more than two types or pieces typically are candidates for presentation on the target device 302. If the first type or piece of content is being presented, content cast from the source device 300 is presented on the target device 302 at block 1108 in a second cast mode/presentation format that is different from the first mode/format at block 1104. If the second type or piece of content is being presented, content cast from the source device 300 is presented on the target device 302 at block 1110 in a third cast mode/presentation format that is different from the first and second modes/formats.

In example embodiments, particular persons may be recognized by the target device and in response a personalized user interface (UI) may be presented on a portion of the target device showing notifications appertaining to recognized persons. FIG. 8 discussed above presents an example of such a UI. Some programs may be configured to use full screen when cast to the target device and other content when cast may be cast in a multitask/overlap mode. Thus, for instance, if a person is watching a daily news program on the target device, then cast content may be presented on the target device in a multi-tasking mode, in which the news program occupies part of the target device screen and the cast content occupies part of the target device screen. On the other hand, if the target device is presenting a movie for example, cast content is not permitted to be presented on the target device screen, and the movie remains in full screen presentation mode. Yet again, a message may be unobtrusively presented on the target device responsive to an attempt to cast content to it giving the user the option to grant access to others that wish to display mixed mode content.

Figure 12:
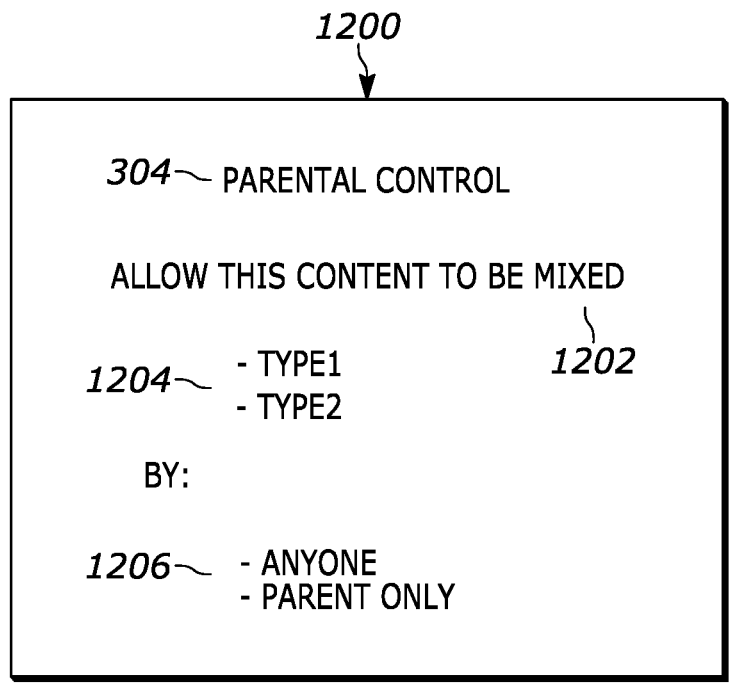
FIG. 12 is a screen shot of a parental control UI for establishing cast modes.

FIG. 12 provides further illumination of the techniques above in the context of a parental control UI 1200 may be provided in which one person (for instance, recognized using face or voice recognition as a parent) decides, responsive to a prompt 1202, what target device content can be mixed with content sought to be cast from a source device 300 using selectors 1204, and by whom using selectors 1206. The UI 1200 may also include selectors to select what content sought to be cast from a source device 300 may be presented on the target device 302.

Figure 13:
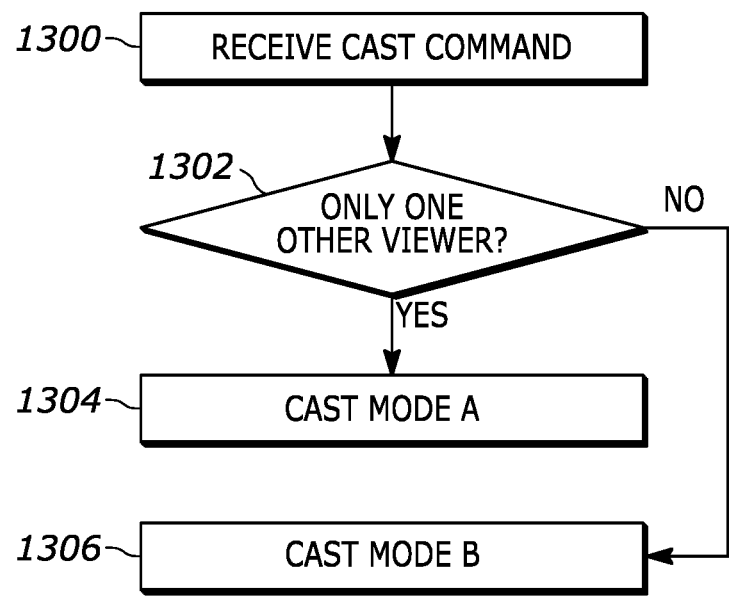
FIG. 13 is a flow chart of example logic for establishing cast mode based on the number of viewers of the target device.

FIG. 13 illustrates a further technique in which a cast command is received at block 1300 and the cast mode depends on whether a sole viewer is detected of the target device or whether a group of people are detected watching the target device at state 1302. For a sole viewer, a first cast mode is established at state 1304 to define the presentation format of content cast from the source device to the target device, whereas for multiple viewers a second cast mode is established at state 1306 to define the presentation format of content cast from the source device to the target device. Some example use cases where mixed cast mode may be desired by the user include: group chat stream, social media posts, stock tickers, sporting event score, sharing video during commercials, text message application, etc.

Another example may be that a first person, e.g., a child, casting content from a source device may have the cast content presented on the target device in only a small window, whereas a second person, e.g., a parent, casting content from a source device may have the cast content presented on the target device full screen, overlaid on or replacing completely any content the target device was presenting. Yet another example use case may be that responsive to a sporting event being televised to multiple target devices in respective homes, the target devices permit display only of content cast from source device that includes group chat.

It is to be understood that whilst present principles have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage accessible to the at least one processor and comprising instructions executable by the at least one processor to:
   receive a cast command in response to input to a source device;
   identify a user providing the cast command;

establish a first cast mode to cast first content to a target device pursuant to the cast command, the first cast mode being established based at least in part on identification of a first user as providing the cast command;

responsive to establishing the first cast mode, present the first content on the target device in a first format;

establish a second cast mode to cast second content to the target device pursuant to the cast command, the second cast mode being established based at least in part on identification of a second user as providing the cast command, the second user being different from the first user, the second cast mode being different from the first cast mode; and responsive to establishing the second cast mode, present the second content on the target device in a second format, the second format being different from the first format, the first format comprising full screen presentation of content, the second format comprising presentation of content in a window presented less than full screen.

2. The first device of claim 1, wherein the first user is identified as an adult and wherein the second user is identified as a child.

3. The first device of claim 1, wherein face recognition is used to identify the first user and/or the second user.

4. The first device of claim 1, wherein voice recognition is used to identify the first user and/or the second user.

5. The first device of claim 1, wherein the cast command is received based on identification of eye movement via eye tracking.

6. The first device of claim 1, wherein the instructions are executable to:

present a message at the target device, the message presented responsive to an attempt to cast content to the target device, the message providing an option for the first user to grant access to others to cast content to the target device.

7. The first device of claim 1, wherein the instructions are executable to:

present a user interface (UI) on a display, the UI comprising a first selector that is selectable to permit the first user to cast content for mixed mode presentation at the target device, and wherein the UI comprises a second selector that is selectable to permit the second user to cast content for mixed mode presentation at the target device.

8. A computer readable storage medium (CRSM) that is not a transitory signal, the computer readable storage medium comprising instructions executable by at least one processor to:

receive a cast command in response to input to a source device;

identify a user providing the cast command;

establish a first cast mode to cast first content to a target device pursuant to the cast command, the first cast mode being established based at least in part on identification of a first user as providing the cast command;

responsive to establishing the first cast mode, present the first content on the target device in a first format;

establish a second cast mode to cast second content to the target device pursuant to the cast command, the second cast mode being established based at least in part on identification of a second user as providing the cast command, the second user being different from the first user, the second cast mode being different from the first cast mode; and responsive to establishing the second cast mode, present the second content on the target device in a second format, the second format being different from the first format, the first format comprising full screen presentation of content, the second format comprising presentation of content in a window presented less than full screen.

9. The CRSM of claim 8, wherein the first user is identified as a parent and wherein the second user is identified as a child.

10. The CRSM of claim 8, wherein face recognition is used to identify the first user and/or the second user.

11. The CRSM of claim 8, wherein voice recognition is used to identify the first user and/or the second user.

12. The CRSM of claim 8, wherein the cast command is received based on identification of eye movement via eye tracking.

13. The CRSM of claim 8, wherein the instructions are executable to:

present a message at the target device, the message presented responsive to an attempt to cast content to the target device, the message providing an option for the first user to grant access to others to cast content to the target device.

14. The CRSM of claim 8, wherein the instructions are executable to:

present a user interface (UI) on a display, the UI comprising a first selector that is selectable to permit the first user to cast content for mixed mode presentation at the target device, and wherein the UI comprises a second selector that is selectable to permit the second user to cast content for mixed mode presentation at the target device.

15. A method, comprising:

receiving a cast command in response to input to a source device;

identifying a user providing the cast command;

establishing a first cast mode to cast first content to a target device pursuant to the cast command, the first cast mode being established based at least in part on identification of a first user as providing the cast command;

responsive to establishing the first cast mode, presenting the first content on the target device in a first format;

establishing a second cast mode to cast second content to the target device pursuant to the cast command, the second cast mode being established based at least in part on identification of a second user as providing the cast command, the second user being different from the first user, the second cast mode being different from the first cast mode; and responsive to establishing the second cast mode, presenting the second content on the target device in a second format, the second format being different from the first format, the first format comprising full screen presentation of content, the second format comprising presentation of content in a window presented less than full screen.

16. The method of claim 15, wherein the first user is identified as a parent and wherein the second user is identified as a child.

17. The method of claim 15, wherein face recognition is used to identify the first user and/or the second user.

18. The method of claim 15, wherein the cast command is received based on identification of eye movement via eye tracking.

19. The method of claim 15, comprising:

presenting a message at the target device, the message presented responsive to an attempt to cast content to the target device, the message providing an option for the first user to grant access to others to cast content to the target device.

20. The method of claim 15, comprising:

presenting a user interface (UI) on a display, the UI comprising a first selector that is selectable to permit the first user to cast content for mixed mode presentation at the target device, and wherein the UI comprises a second selector that is selectable to permit the second user to cast content for mixed mode presentation at the target device.

* * * * *